Oct. 29, 1968  B. M. S. WALZBERG  3,408,145
AUTO-FOCUS CAMERA AND DIAPHRAGM MEANS THEREFOR
Filed Sept. 29, 1965  2 Sheets-Sheet 1
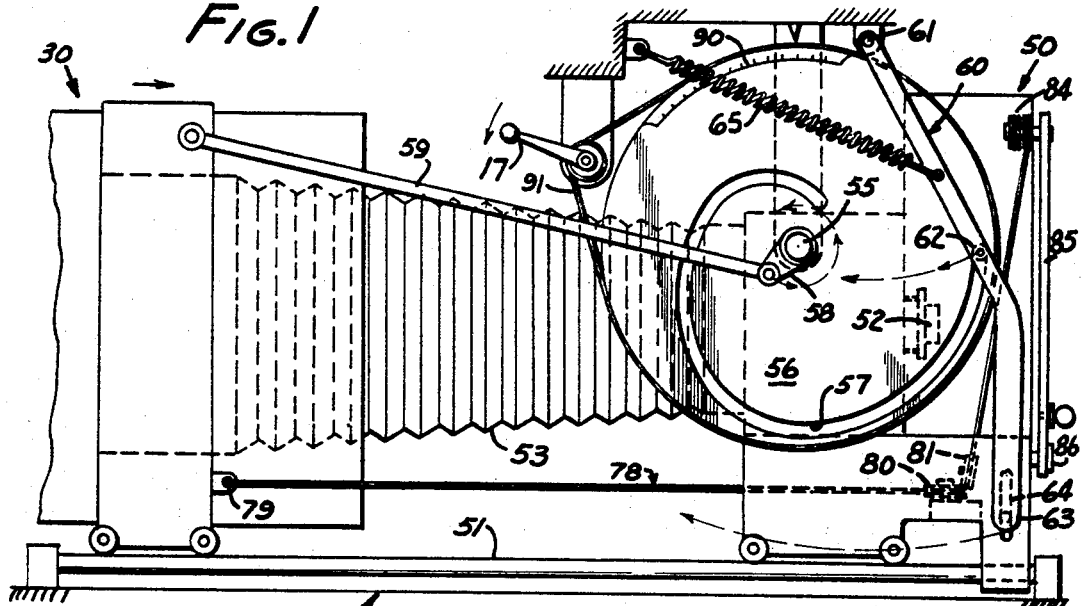
FIG. 1
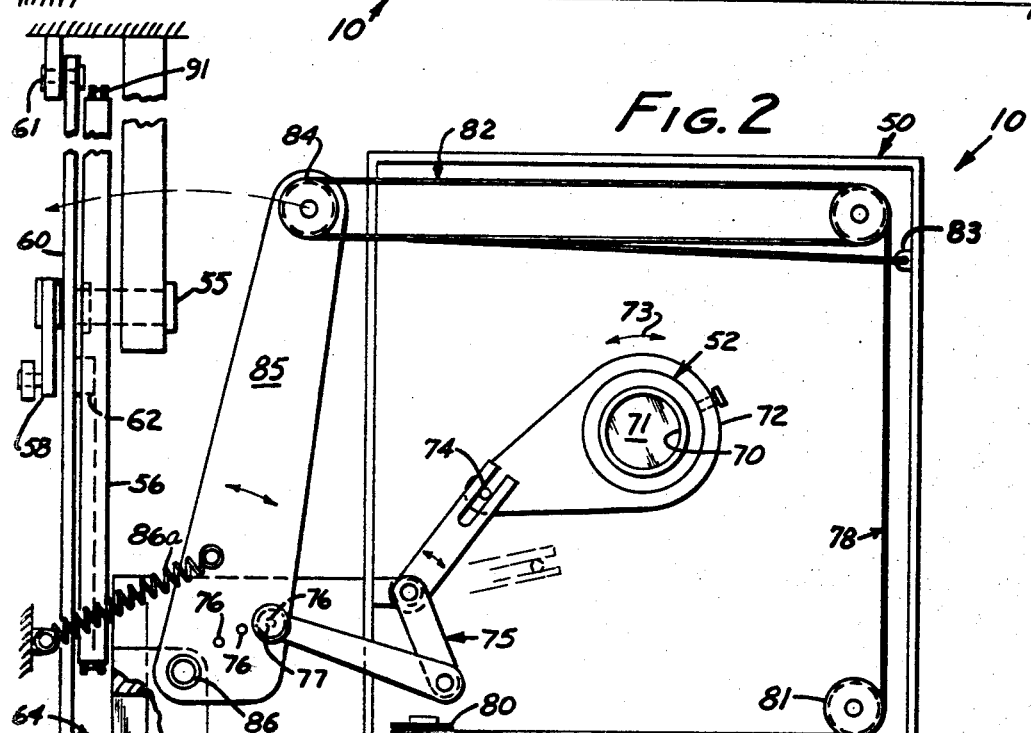
FIG. 2
FIG. 3
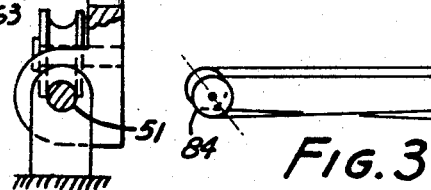
INVENTOR.
BERNARR M.S. WALZBERG
BY
ATTORNEYS.

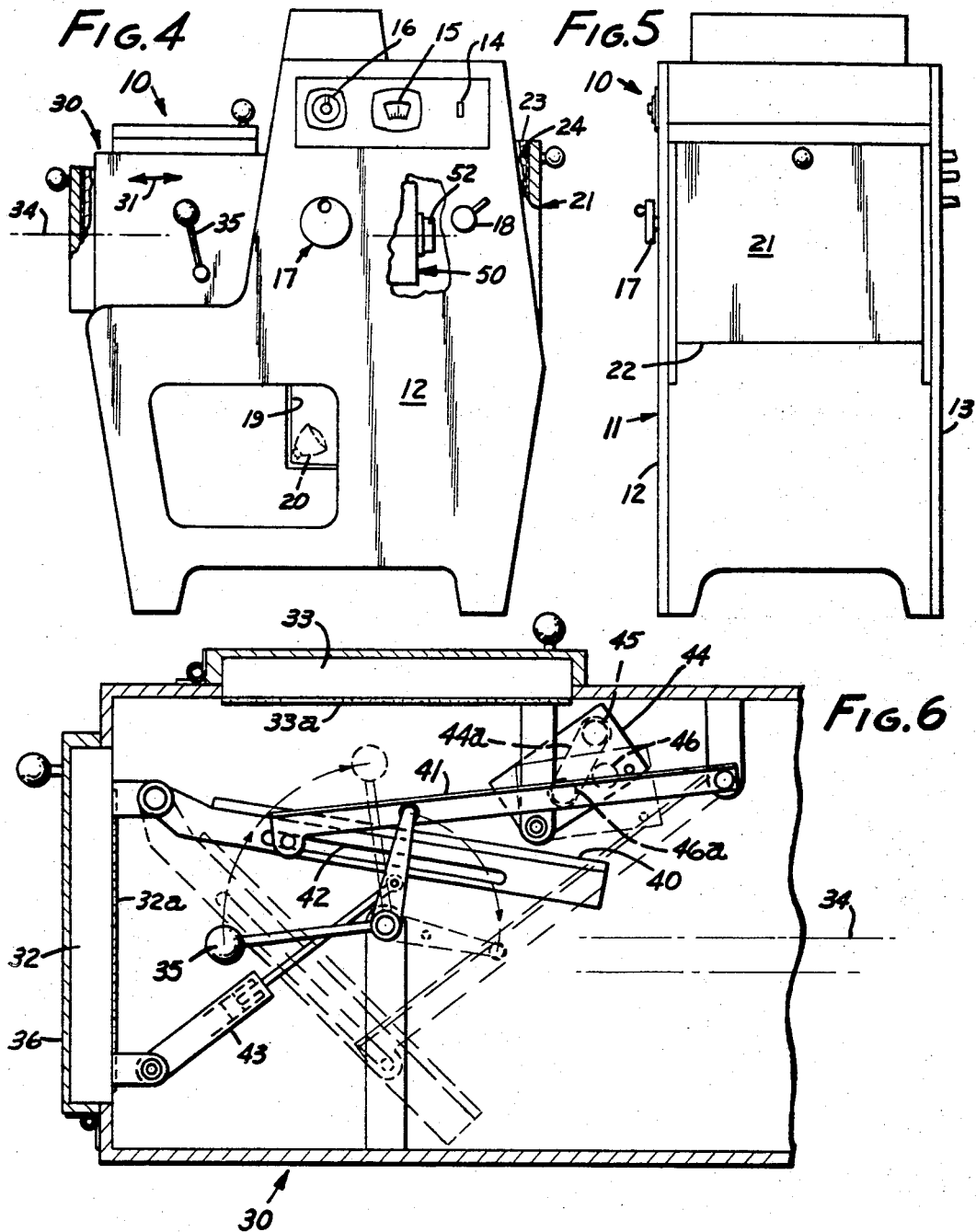

United States Patent Office 3,408,145
Patented Oct. 29, 1968

3,408,145
AUTO-FOCUS CAMERA AND DIAPHRAGM
MEANS THEREFOR
Bernarr M. S. Walzberg, 104 E St.,
Redwood City, Calif. 94063
Filed Sept. 29, 1965, Ser. No. 491,110
6 Claims. (Cl. 355—59)

ABSTRACT OF THE DISCLOSURE

A camera for use in the graphic arts for making negatives from prepared copy. The device includes a frame with a track along which a lens carriage and a negative carriage are shiftable. The lens carriage carries a lens so as to shift it along its optical axis, and the negative carriage is equipped with a negative holder which it can shift along the optical axis. An adjustable-aperture diaphragm is carried by the lens carriage adjacent to the lens and a primary linkage interconnects the frame, the diaphragm and both carriages, so as to adjust the spacing between the lens and a copy holder, and between the lens and the negative holder so as to vary the magnification while maintaining focus and simultaneously adjusting the aperture. Optionally, two copy holders are included, one of which involves a mirror for the purpose of preparing direct or reverse negatives. As an additional feature, a secondary linkage is included in the primary linkage for adjusting the light intensity independently of that of the adjustment provided by the primary linkage.

---

This invention relates to a camera especially suited for use in the graphic arts.

The requirements for varying magnification in photographic steps in the graphic arts are well known. What is essentially needed is a camera with convenient means for handling the copy and the negatives, together with a lens which will serve to magnify or reduce the copy as desired with only the simplest of adjustments, while still maintaining a predetermined light intensity rating (*f* setting). It is an object of this invention to provide such a camera and, in adidtion, one which can provide both direct and reverse reading copy.

A camera according to this invention includes a lens which has an optical axis. The device includes a frame which supports a copy holder that is disposed on the optical axis. Track means is supported by this frame, which track means extends parallel to this optical axis. A lens carriage is mounted to the track and is shiftable along it so that it mounts said lens for shifting movement along the optical axis, and a negative carriage is similarly mounted to the track and is thereby shiftable along this optical axis. A negative holder is mounted to the negative carriage. An adjustable-aperture diaphragm is carried by the lens carriage adjacent to the lens on the optical axis and a primary linkage interconnects the frame, the diaphragm and the carriages, whereby to adjust the spacing between the lens and the copy holder, and between the lens and the negative holder so as to vary the magnification while still maintaining the focus, and simultaneously to adjust the aperture to maintain a substantially constant light intensity.

According to another preferred but optional feature of this invention, a secondary linkage is included in the primary linkage for adjusting the light intensity independently of the primary linkage.

According to still another preferred but optional feature of the invention, the primary linkage includes a crank and a cam whereby to shift one of said carriages relative to the crank axis, this crank axis being fixed to the frame.

The above and other features of this invention will be fully understood from the following detailed description and the accompanying drawings in which:

FIG. 1 is a side elevation partly in cutaway cross-section showing a portion of the presently preferred embodiment of the invention;

FIG. 2 is a right-hand end view of FIG. 1;

FIG. 3 is a fragmentary schematic view of a portion of FIG. 2;

FIG. 4 is a side elevation of the machine;

FIG. 5 is a right-hand view of FIG. 4; and

FIG. 6 is a fragmentary cutaway view showing another portion of the invention.

A camera 10 according to the invention is shown in FIGS. 1, 4 and 5. As best shown in FIGS. 4 and 5, a frame 11 includes side plates 12, 13, which are adapted to rest upon the floor.

The frame (FIG. 4) supports the various elements of the camera. On plate 12 there is a light switch 14, a magnification indicator 15 and a timer 16. A crank 17, which controls a linkage yet to be described, is mounted to side plate 12. A wedge lock 18 is mounted to the side plate. Between the side plates, there is a light box 19 with lamps 20 which are directed upwardly to the right in FIG. 4 to illuminate the copy.

At the right end of the camera in FIG. 4, there is a copy holder 21 which comprises a hinged door 22, preferably with a glass retainer plate to retain the copy 23 to the inside surface 24 of the copy holder door.

At the left end of FIG. 4, there can be seen a negative carriage 30 which is adapted to move left and right in the direction indicated by arrow 31. This carriage carries a first and a second negative holder 32, 33, for negatives 32a, 33a, respectively. Only one is used at a time. The drawing shows the position of both as a convenience in disclosure. These negative holders are preferably vacuum plates which, when a vacuum is exerted on them, will hold a sheet of paper to their surface. The term "negative" is used herein in the sense of a sheet which receives an image. Whether it is white on black or vice versa is immaterial.

The camera has a central optical axis 34. Holders 21 and 32 are normal to said axis, and holder 33 lies parallel to this axis. A selector handle 35 is pivotally mounted to the frame for selecting between the two negative holders. This provides for selection between direct and reverse reading copy. Negative holder 32 is characteristic of both of them and includes a hinged door 36 against whose inside surface negative 32a is held, preferably by a vacuum plate to be described later. FIG. 6 shows this selector means.

A mirror 40 is hinged-mounted inside the negative carriage, and the selector handle 35 is connected to link 41 and slot 42 to move the mirror between a first position shown in dotted line and a second position shown in solid line. In the dotted line position, the upper negative holder will be used. In the solid line position, the mirror is out of the way, and the first negative holder will be in use. A dash pot 43 damps the pivotal movement of the mirror.

When vacuum plates are used to hold the negative paper, a valve plate 44 with a channel 44a may be controlled by link 41 so as to cause vacuum ports 45, 46, selectively to be connected to a vacuum port 46a, and thence through hoses to a selected one of the vacuum holders. The election of holder is a funtcion of the position of the selector handle so that when the mirror is in the dashed line position, the vacuum plate respective to holder 33 is activated and vice versa.

Between the plates and to the right of the negative carriage, there is a lens carriage 50 (FIG. 1). Both this and the negative carriage are mounted to a track 51, which track in turn is mounted to the frame. The carriage carries lens 52 which is on the optical axis. The lens axis intersects the copy holder and the first negative holder, and the optical axis is deflected to the second negative holder when the mirror is in the dashed line position of FIG. 6. Between the negative carriage and the lens carriage, there extends a typical camera bellows 53 to exclude from the left side of the lens light from lamps 20. The only light which reaches this region passes through the lens.

Primary linkage means is provided for adjusting the distance between the lens and the copy holder, and between the lens and the negative holders. Basically, this control is derived from crank 17 through its shaft 55, which shaft is journaled in side frame 12. This shaft carries a cam plate 56 with a cam track 57 thereon. It also carries a secondary crank 58. The secondary crank connects, through a link 59 which is pin-pivoted at both ends, to the negative carriage so that rotation of shaft 55 shifts the negative carriage toward and away from the lens. This forms a portion of the means for maintaining focus when the magnification is changed. The remainder of this means comprises the crank shaft and a follower linkage which includes an arm 60 that is pin-jointed to the frame by pin 61. The arm carries at a medial location thereof a cam follower 62 which rides in the track so as to pivot the free end 63 of arm 60. A pin-slot combination 64 forms a link between arm 60 and the lens carriage so that swinging of the arm moves the lens carriage back and forth. It is obvious now that the cam track can be tailored to move the lens carriage to a desired position relative to the copy holder, and to position the two carriages properly as a function of the cam track position and the angular position of the secondary crank. A bias spring 65 tends to pivot arm 60 clockwise. The track is duplicated at the right-hand side of FIG. 2.

The foregoing linkage forms a portion of a primary linkage which has as its object the shifting of the two carriages relative to the copy so that the focus is maintained while the magnification of the copy is varied. An equally important matter is in the maintenance of light intensity which requires the adjustment of a diaphragm 70 which has an adjustable aperture 71 in accordance with known camera principles. The size of the aperture is arranged by rotating the diaphragm ring 72 in directions indicated by arrow 73. This in turn is accomplished by a pin-slot combination 74, the motion of which is derived from a secondary linkage 75, which includes three holes 76 and a pin 77 insertable in any one of them, so that independent light intensity adjustments can be made by inserting the pin in selected one of the holes so as to make a gross adjustment of the aperture. The steady adjustment of the aperture in accordance with the changing of the magnification is accomplished by the primary linkage which additionally includes a cable 78 which is joined to the negative carriage at post 79 (FIG. 1) which proceeds around a pair of pulleys 80, 81, and then to a double-pulley reduction arrangement 82 (FIG. 3). The other end of the cable is mounted to post 83 on the lens carriage.

A pulley 84 of arrangement 82 is mounted to a lever 85, which in turn is pinned at joint 86 to the lens carriage. It will now be seen that as the two carriages move apart from each other, their separation will be reflected in a pivoting movement of lever 85, which in turn will pivot the secondary linkage and will adjust the diaphragm so as to maintain the light intensity at a desired value. The operation of this linkage is opposed by spring 86a. It will be understood that the diaphragm ring 72 could be directly connected to the primary linkage through a slot linkage to lever 85 without the insertion of the secondary linkage 75. The secondary linkage enables several basic light intensity ratings to be set in, such as $f/16$, $f/22$ and $f/32$, and then the primary linkage takes over in the steady adjustment of the device so as to maintain this pre-selected light intensity.

A scale 90 is drawn on the periphery of the cam plate and is visible through the port that forms indicator 15. Therefore, the magnification can be read off directly as a function of the rotary position of the cam. The cam is turned by a bicycle chain 91 that meshes with gear teeth on the outside of the cam plate. In turn, this is driven by crank 17 as best shown in FIG. 1.

A suitable lens is a Graphic Raptor Field Lens, Wollensak 10¾, 273 mm., $f/18.8$.

The operation of the device should be evident from the foregoing. First, the copy is mounted to the copy holder, and then crank 17 is turned to secure the desired magnification value. A negative is secured to one or the other of the negative holders, the selection being made by turning selector handle 35, and this will in turn apply the vacuum to the selected one of the negative holders. Thereafter, the light is turned on for the desired period of time, illuminating the copy, and the negative will properly be exposed. The negative will thereafter be processed as desired.

The operation of the linkage should be evident from the foregoing. It is immaterial which of the carriages is connected to the secondary crank, and which to the cam follower, but the device shown has proved to be quite effective because the secondary crank positions the negative carriage at an easily calculated location, and then the cam track can be tailored to place the lens carriage at the desired position. Magnification is read off the cam plate as a function of its angular adjustment. This is the most compact where arm 60 is directly connected to the lens carriage. The reverse, however, is practical, although less compact.

It is evident that power means could be supplied for selecting between the two negative holders and also that means other than vacuum plates may be used to hold the negative paper thereto.

The term "negative" has been used without any intention to limit the device to the production of negatives. It is quite evident that, starting with a reverse print such as a negative, a positive image may be produced at the negative plates. However, the terminology is well understood by those skilled in the art, and is used as a matter of convenience.

This invention is not to be limited by the embodiment shown in the drawings and described in the description which is given by way of example and not of limitation, but only in accordance with the scope of the appended claims.

I claim:

1. A camera comprising: a lens having an optical axis; a frame; a copy holder mounted to said frame and disposed on said axis; track means supported by said frame, which track means extends parallel to said optical axis; a lens carriage mounted to the track and shiftable therealong and carrying said lens along said optical axis; a negative carriage mounted to the track and shiftable along said optical axis; a negative holder mounted to the negative carriage so as to be shifted along the optical axis by the negative carriage; an adjustable-aperture diaphragm carried by the lens carriage adjacent to the lens on the optical axis; and a primary linkage interconnecting the frame, the diaphragm, and the carriages, whereby to adjust the spacing between the lens and the copy holder, and the spacing between the lens and the negative holder, so as to vary the magnification while maintaining the focus, a vacuum plate incorporated in both negative holders for holding negatives to the respective one of said holders, and selector means for selection of which of said vacuum plates is to be activated.

2. A camera according to claim 1 in which linkage means is provided for moving said mirror between said two positions, said linkage means controlling said selector valve.

3. A camera according to claim 2 in which the primary linkage comprises a primary crank rotatably mounted to the frame; a cam rotatably mounted to the frame and linked to the primary crank for rotation thereby, the cam bearing a cam track; a cam follower mounted to the frame engaged to the cam track in order to follow the same, and engaged to one of the carriages so as to shift it along the axis as a function of cam position, and a secondary crank rotatably mounted to the frame and linked to the primary crank for rotation thereby and connected to the other of said carriages so as to shift it along the axis as a function of primary crank position.

4. A camera according to claim 2 in which the primary linkage includes an interconnection between the two carriages which adjusts the size of the aperture as a function of the spacing apart of the carriage.

5. A camera according to claim 4 in which the primary linkage comprises a primary crank rotatably mounted to the frame; a cam rotatably mounted to the frame and linked to the primary crank for rotation thereby, the cam bearing a cam track; a cam follower mounted to the frame engaged to the cam track in order to follow the same, and engaged to one of the carriages so as to shift it along the axis as a function of cam position, and a secondary crank rotatably mounted to the frame and linked to the primary crank for rotation thereby and connected to the other of said carriages so as to shift it along the axis as a function of primary crank position.

6. A camera comprising: a lens having an optical axis; a frame; a copy holder mounted to said frame and disposed on said axis; track means supported by said frame, which track means extends parallel to said optical axis; a lens carriage mounted to the track and shiftable therealong, and carrying said lens along said optical axis; a negative carriage mounted to the track and shiftable along said optical axis; a negative holder mounted to the negative carriage so as to be shifted along the optical axis by the negative carriage; an adjustable-aperture diaphragm carried by the lens carriage adjacent to the lens on the optical axis; and a primary linkage interconnecting the frame, the diaphragm, and the carriages, whereby to adjust the spacing between the lens and the copy holder, and the spacing between the lens and the negative holder, so as to vary the magnification while maintaining the focus, and simultaneously to adjust the aperture, said primary linkage including an interconnection between the two carriages which adjusts the size of the aperture as a function of the spacing apart of the carriages, the primary linkage comprising a primary crank rotatably mounted to the frame, a cam rotatably mounted to the frame and linked to the primary crank for rotation thereby; a cam track and the cam; a cam follower mounted to the frame engaged to the cam track in order to follow the same, and engaged to one of the carriages so as to shift it along the axis as a function of the cam position, and a secondary crank rotatably mounted to the frame and linked to the primary crank for rotation thereby, and connected to the other of said carriages so as to shift it along the axis as a function of primary crank position.

References Cited

UNITED STATES PATENTS

| | | | |
|---|---|---|---|
| 2,727,431 | 12/1955 | Blatherwick | 88—24 |
| 3,208,338 | 9/1965 | Davis | 88—24 |
| 3,211,053 | 10/1965 | Wanielista et al. | 88—24 |

NORTON ANSHER, *Primary Examiner.*

RICHARD A. WINTERCORN, *Assistant Examiner.*

UNITED STATES PATENT OFFICE
CERTIFICATE OF CORRECTION

Patent No. 3,408,145   Dated October 29, 1968

Inventor(s) B. M. S. WALZBERG

It is certified that error appears in the above-identified patent and that said Letters Patent are hereby corrected as shown below:

Claim 6 (column 6, line 15), "a cam track and the cam"

should be --a cam track on the cam--

Signed and sealed this 8th day of August 1972.

(SEAL)
Attest:

EDWARD M. FLETCHER, JR.
Attesting Officer

ROBERT GOTTSCHALK
Commissioner of Patents